June 23, 1970  A. F. GAGE  3,516,591
FRICTION WELDING APPARATUS
Filed June 30, 1967  9 Sheets-Sheet 1

INVENTOR.
ARTHUR F. GAGE
BY Strauch, Nolan, Neale,
Nies & Kurz
ATTORNEYS

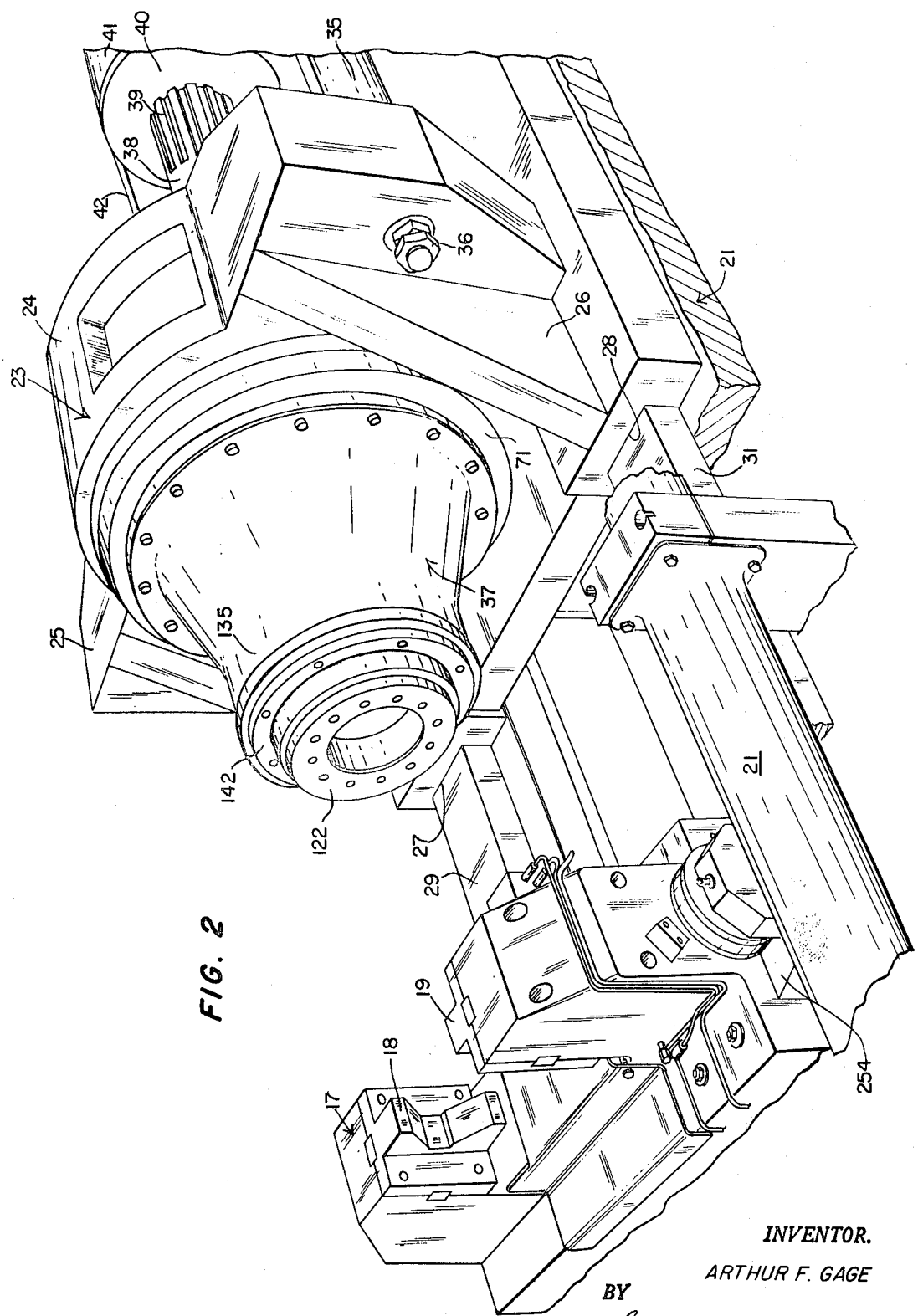

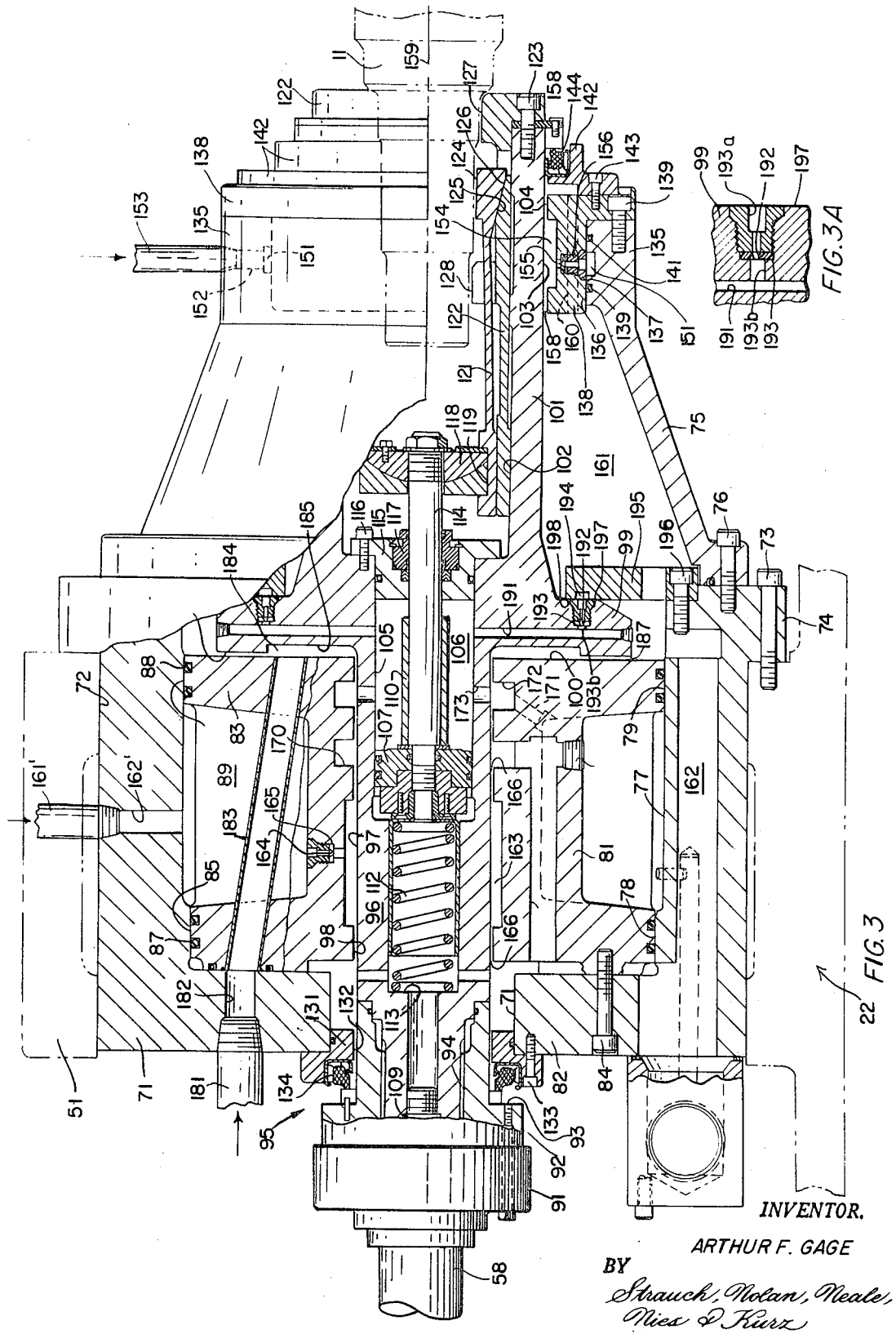

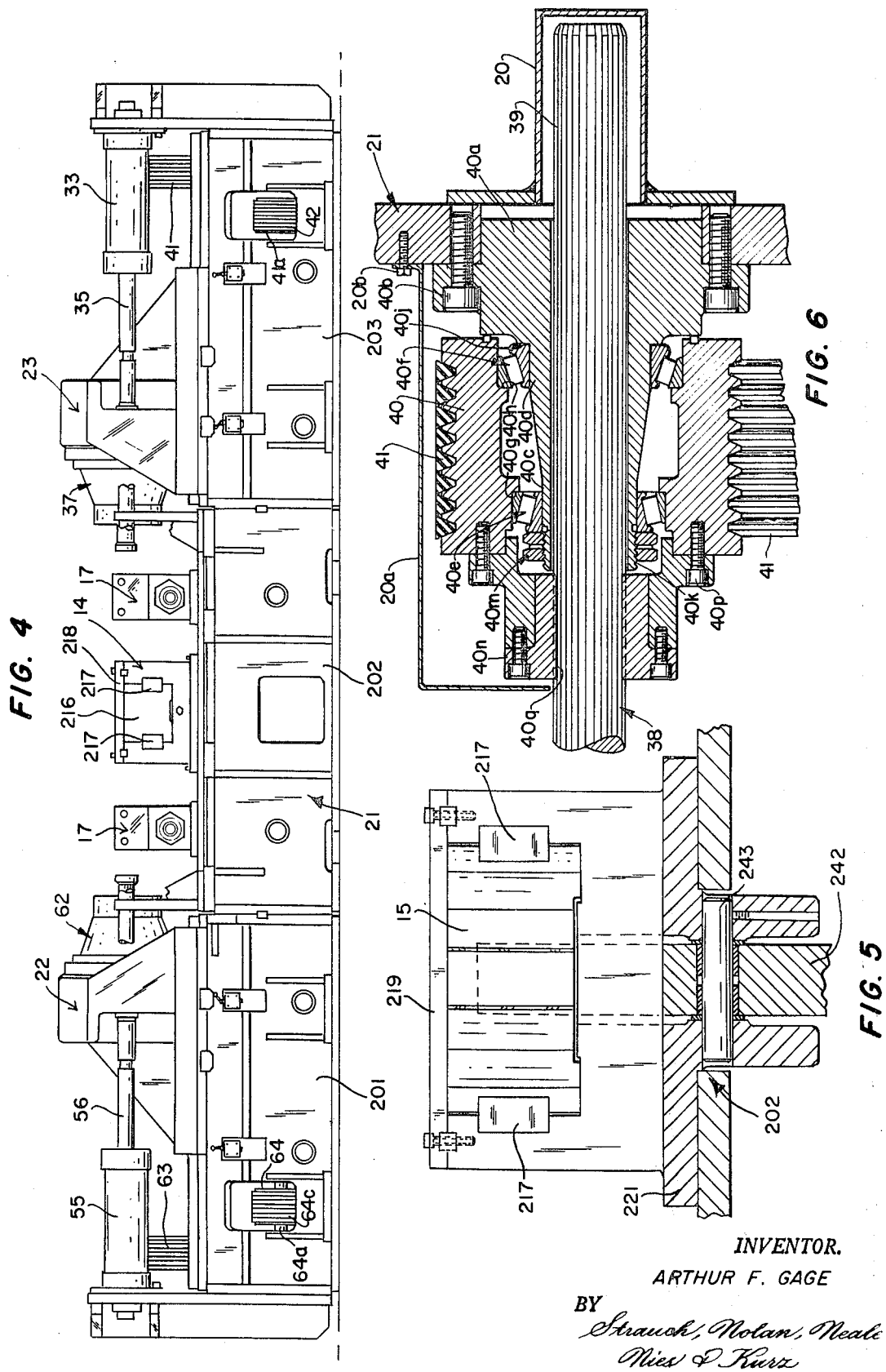

INVENTOR.
ARTHUR F. GAGE

June 23, 1970     A. F. GAGE     3,516,591

FRICTION WELDING APPARATUS

Filed June 30, 1967     9 Sheets-Sheet 6

INVENTOR.
ARTHUR F. GAGE
BY
Strauch, Nolan, Neale,
Nies & Kurz
ATTORNEYS

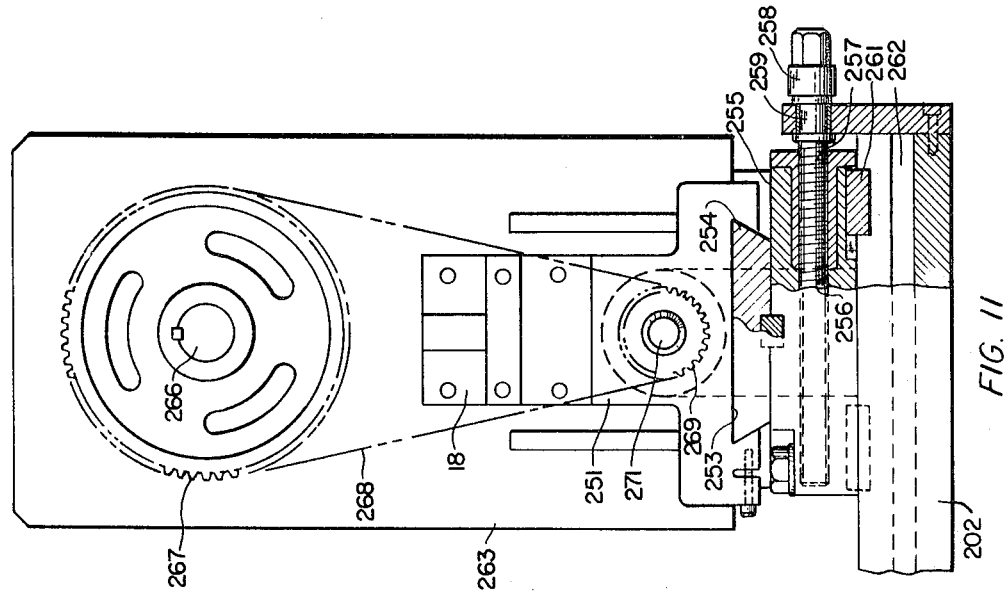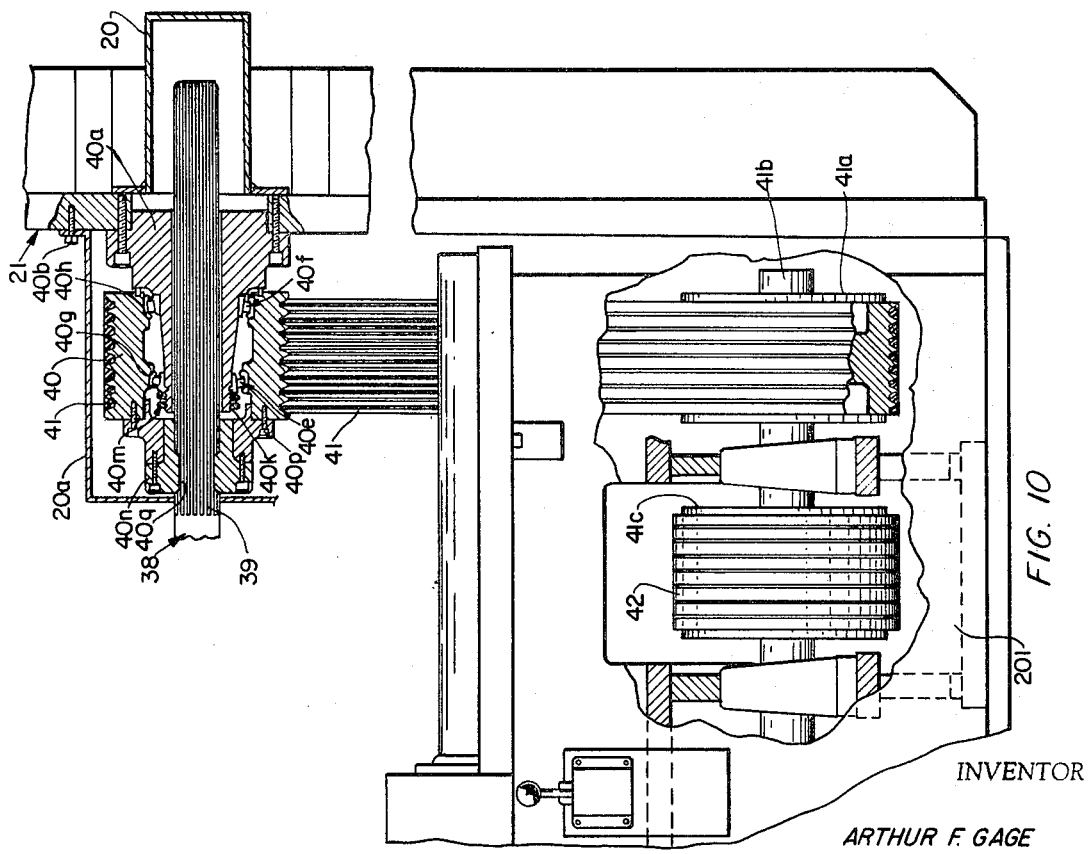

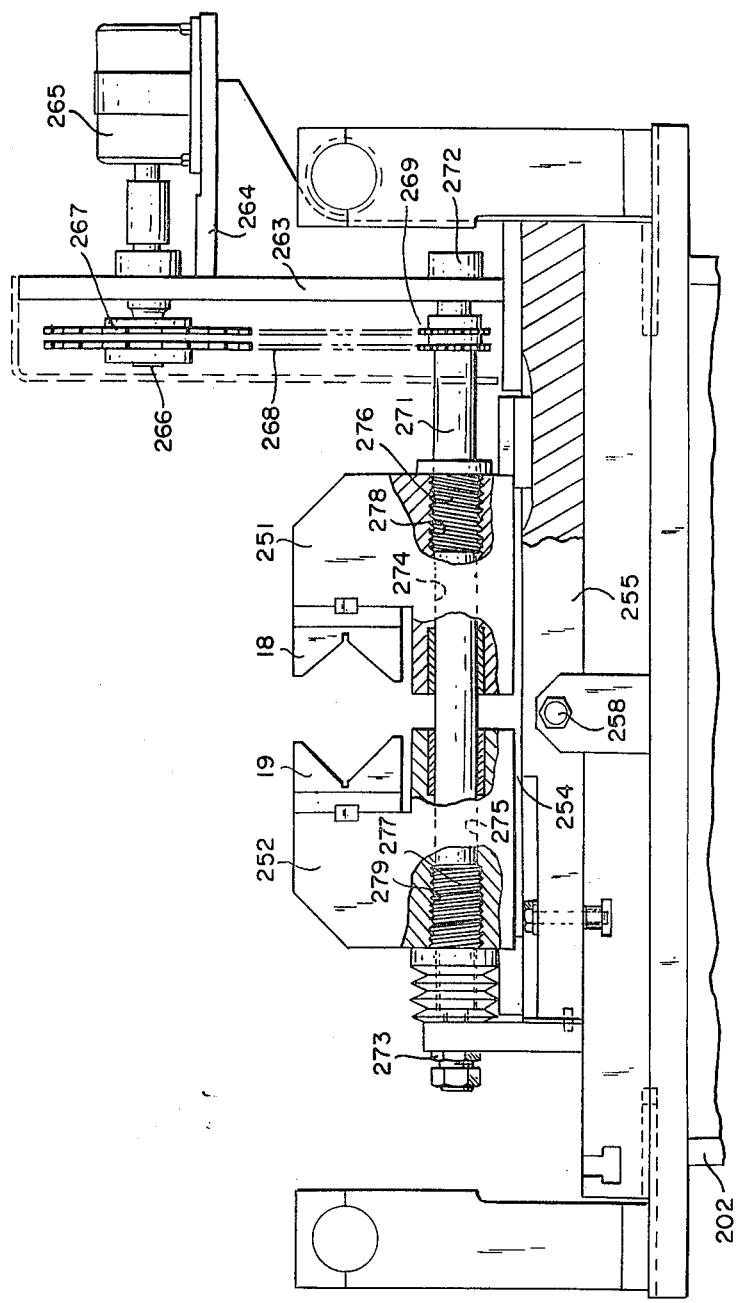

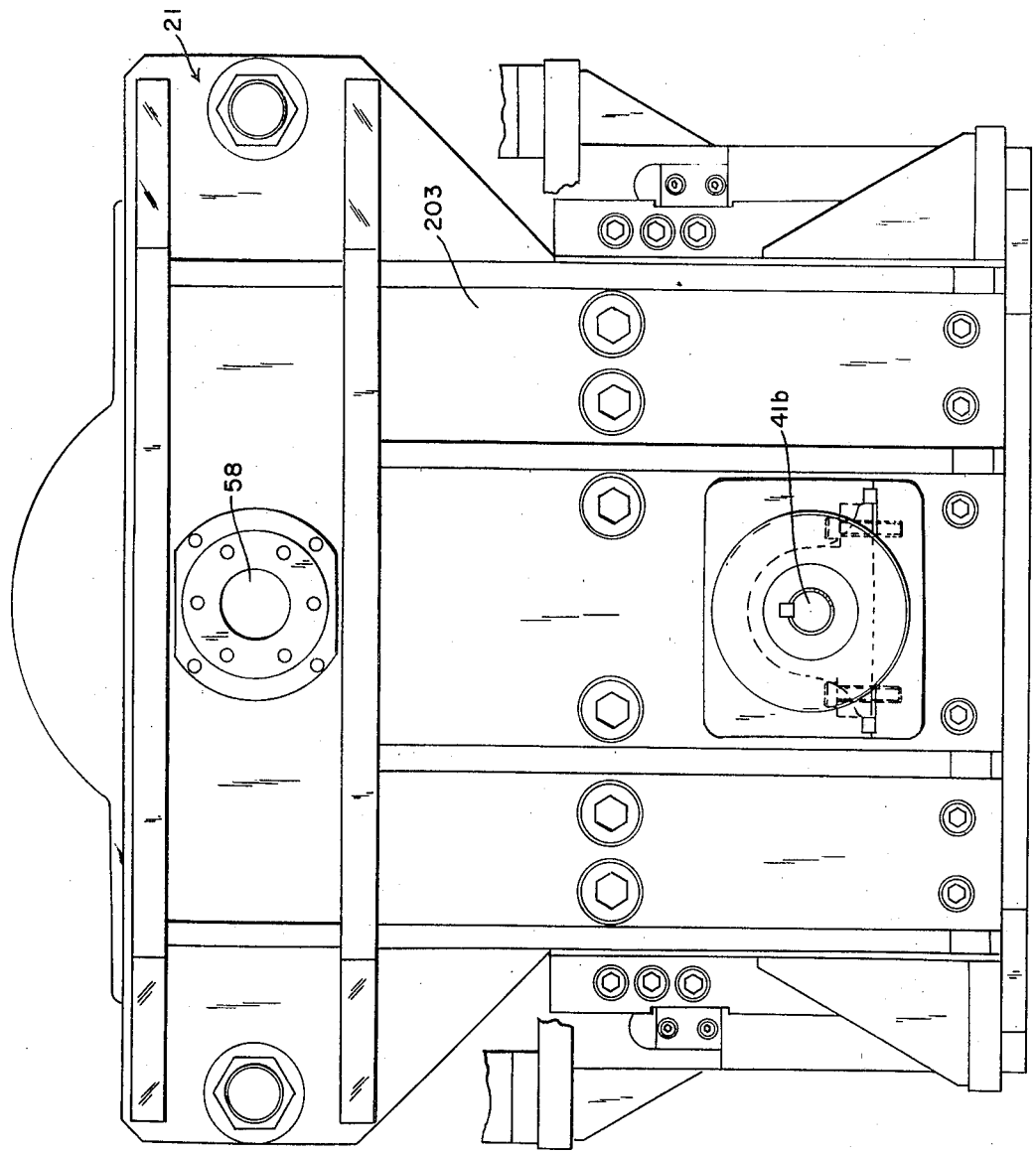

United States Patent Office 3,516,591
Patented June 23, 1970

3,516,591
FRICTION WELDING APPARATUS
Arthur F. Gage, Detroit, Mich., assignor, by mesne assignments, to Rockwell-Standard Company, Pittsburgh, Pa., a corporation of Delaware
Filed June 30, 1967, Ser. No. 650,317
Int. Cl. B23k 27/00
U.S. Cl. 228—2          16 Claims

ABSTRACT OF THE DISCLOSURE

A friction welding apparatus is particularly adapted for the friction welding of relatively heavy workpieces, as for example the center section and wheel bearing end spindles of a drive axle housing. The apparatus comprises a very heavy rigid support structure consisting of a central base portion on which the stationary workpiece is clamped against movement and two essentially identical but reversed end base portions on which rotating workpieces to be welded to the stationary workpiece engagement with the stationary workpiece. The central and end base portions are rigidly secured together end to end in the assembly. The central base portion mounts three pairs of laterally movable jaws and mechanism for moving the jaws of each pair into clamping engagement with the stationary workpiece at three places along the workpiece. The mechanism comprises a fluid pressure cylinder actuated lever system for actuating the central pair of jaws and similar differentially threaded shaft arrangements for actuating the end pairs of jaws. The end base portions each comprise hydrostatic journal and thrust bearings for mounting an arbor assembly having a clutch for attachment of one of the rotating workpieces. Individual and independent power sources each comprising a motor, clutch and brake assembly are mounted separate from the support structure and connected by a special belt and pulley drive to the arbor assembly for each rotating workpiece.

BACKGROUND AND SUMMARY OF INVENTION

The friction welding of relatively lightweight parts is well known, and apparatus has been proposed wherein relatively rotating parts such as thin metal shells and the like are forced into rubbing contact until the generated heat due to friction results in fusion of the engaged regions and subsequent friction welding. While there has been some academic mention of friction welding together of relatively heavy parts as in literature, and certain structural arrangements have been suggested for mounting relatively rotating workpieces, the available art shows a clear lack of practical experience necessary to appreciate the structural requirements involved when very heavy metal masses such as steel drive axle housing components are brought together into relatively rotating frictional engagement. It is the major object of the invention to provide such structure for heavy duty friction welding.

A further object of the invention is to provide a novel apparatus for friction welding wherein a stationary workpiece is clamped against movement on a support structure, and at least one rotating workpiece is carried by a unit that is slidably mounted on the support structure and includes drive mechanism for the workpiece operably connected to a power source that is mounted independently of the support structure.

A further object pursuant to the foregoing is to provide a support structure wherein the stationary workpiece and rotating workpiece are each wholly carried by end to end attached portions of the support structure. In this connection the invention contemplates similar but reversed end structure portions carrying rotating workpieces, each end portion secured to an opposite end of a central portion mounting the stationary workpiece.

Another object of the invention is to provide novel jaw structure and actuating mechanisms for clamping a stationary workpiece on a support structure in a friction welding apparatus. In this connection one pair of jaws is oppositely slidably mounted and interconnected for actuation by a pair of pivoted levers connected at one end to the respective jaws and having their other ends operably connected to an expansible fluid pressure cylinder. Two additional pairs of jaws are provided for. Each of these pairs is mounted on opposed slidable members having differential threaded connection to a power driven shaft.

BRIEF DESCRIPTION OF DRAWINGS

FIG. 2 is a generally perspective view showing a hydrostatic bearing unit from the apparatus of FIG. 1;

FIG. 3 is an elevation partly broken away and in section showing structural details of the unit of FIG. 2;

FIG. 3A is an enlarged fragmentary view illustrating the orifice construction for delivering oil to the front thrust bearing shown in FIG. 3;

FIG. 4 is a side elevation showing the friction welding apparatus of FIG. 1;

FIG. 5 is a fragmentary side elevation partially broken away and in section looking into one of the stationary workpiece jaws;

FIG. 6 is a fragmentary view mainly in section showing details of one form of drive to each hydrostatic bearing unit;

FIG. 10 is a side elevation partially broken away and in section showing a preferred form of hydrostatic bearing drive arrangement;

FIG. 11 is a side elevational partially broken away and in section showing details of the end clamps for the stationary workpiece;

FIG. 12 is an end elevation partially in section showing further detail of the end clamps of FIG. 11; and FIG. 13 is an enlarged end elevation of the machine of FIGS. 1 and 4, showing location of essential parts.

PREFERRED EMBODIMENTS

Figure 1:
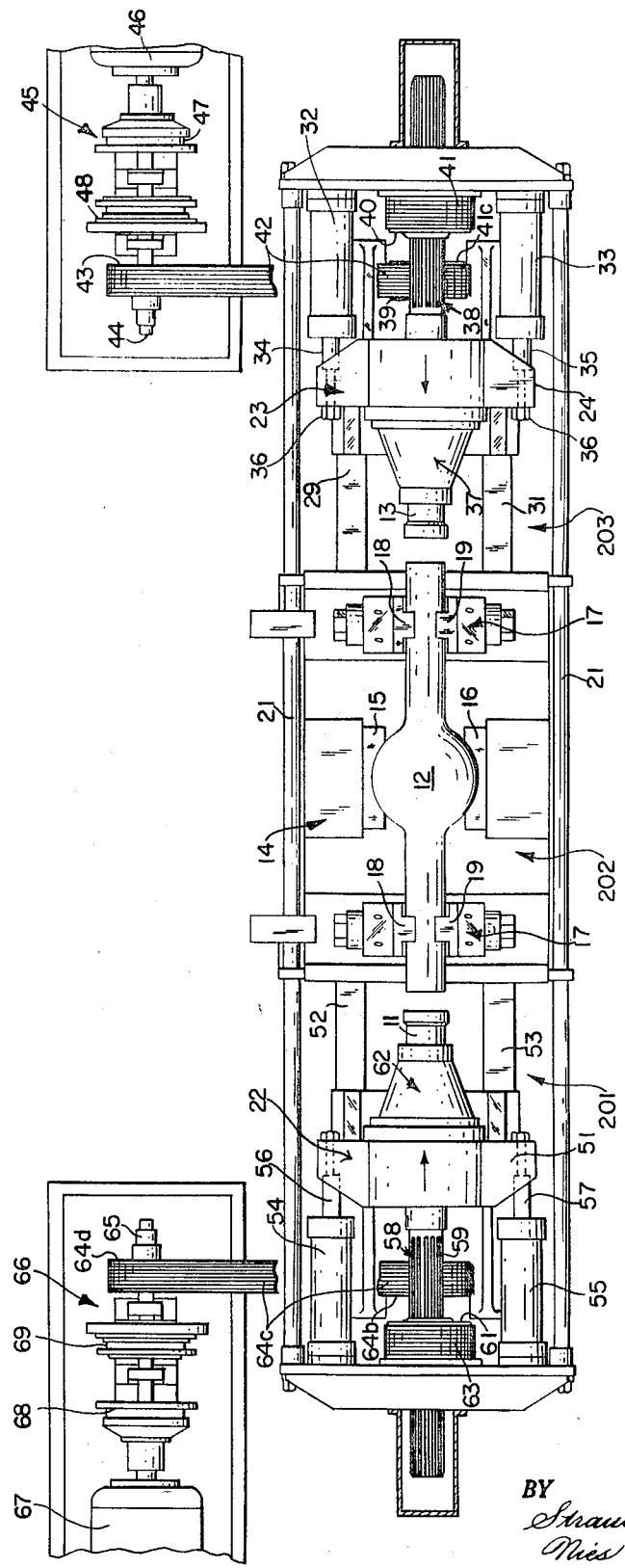
FIG. 1 is a top plan view illustrating the arrangement of parts in apparatus incorporating a preferred embodiment of the invention.
Figure 7:
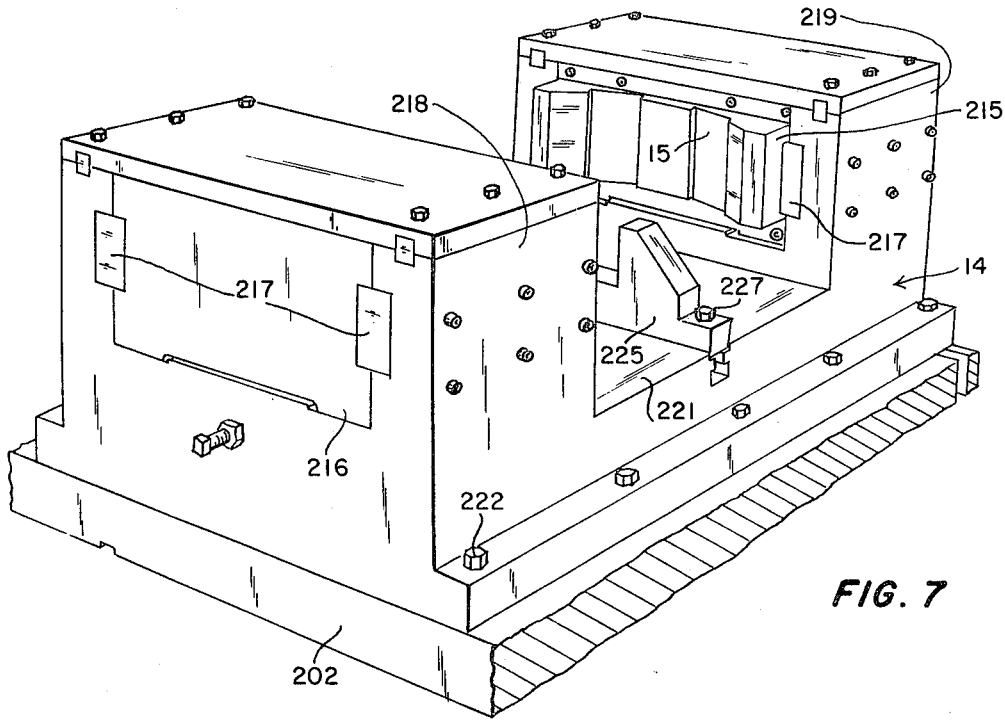
FIG. 7 is a generally perspective view partly broken away and sectioned showing details of the center stationary workpiece clamping portion of the support structure.

FIG. 1 illustrates a friction welding apparatus wherein three workpieces 11, 12 and 13 are adapted to be friction welded together. In this arrangement the central workpiece 12, which may be an axle housing center section, is held stationary and the other two workpieces, which may be wheel bearing end spindles 11 and 13, are rotated while being moved into contact with opposite ends of workpiece 12.

The central workpiece 12 is mounted in a cradle structure 14 wherein opposite sides are engaged and held suitably by adjustable jaws 15 and 16. The oppositely extending arms of workpiece 12 are clamped tightly in similar fixtures 17 each of which has opposed adjustable jaws indicated at 18 and 19 for gripping the workpiece. This arrangement supports and anchors workpiece 12 against rotation or axial displacement. Cradle 14 is secured rigidly to the machine base 21.

Workpiece 11 is mounted upon a hydrostatic bearing unit carrier 22 and workpiece 13 is mounted upon a similar hydrostatic bearing unit carrier 23 at opposite ends of base 21. These carriers 22 and 23 and the bearing units on them are essentially the same.

FIG. 2 shows carrier 23 as comprising an annular frame 24 having a rigid side members 25 and 26 formed at their lower ends with parallel rectangular guideway grooves 27 and 28 respectively slidably fitting with parallel rails 29 and 31 on the machine base 21.

A pair of power cylinders 32 and 33 are fixed on base 21 with their piston rods 34 and 35, respectively, projecting parallel and at the same level into rigid connection with carrier frame 24. Fasteners such as nuts 36 assure that piston rods 34 and 35 are unitarily secured to frame 24. As will appear introduction of fluid under pressure into both cylinders 32 and 33 will advance the carrier and the bearing unit cartridge 37 thereon toward the stationary workpiece 12.

A shaft 38, located centrally of carrier 23 and midway between cylinders 32 and 33, has a splined section 39 which axially slidably but nonrotatably extends through the hub of an axially stationary pulley 40 (FIGS. 6 and 10). A belt 41 is trained around pulley 40 and an idler pulley 41a. Pulley 41a, as shown in FIG. 10, is mounted on an idler shaft 41b which is suitably journalled for rotation about an axis extending parallel to and vertically below shaft 38. A motor driven pulley 41c is also mounted on shaft 41b as shown. A belt 42 (FIG. 1) connects pulley 41c to a pulley 43 on the output shaft 44 of a power assembly 45 consisting essentially of an electric motor 46 connected to shaft 44 through a clutch unit at 47 and having a braking unit associated therewith at 48.

Referring to FIG. 6, a sleeve or spindle 40a secured to the machine frame as by screws 40b coaxially surrounds shaft 38 so as to permit free sliding of the shaft therethrough. Sleeve 40a is formed with axially spaced cylindrical sections 40c and 40d, on which are mounted the inner races of tapered roller bearing units 40e and 40f respectively. The inner ends of the outer races of the bearing units axially abut internal annular shoulders 40g and 40h respectively of pulley 40. The outer end of the internal race of bearing unit 40f abuts axial shoulder 40j on the sleeve. The outer end of the sleeve is threaded at 40k to mount a locknut assembly 40m on which abuts the outer end of the inner race of bearing unit 40e. When the locknut assembly is tightened the bearings are preloaded and retained, and as shown these bearing units 40e and 40f also act as thrust bearings for preventing axial displacement of pulley 40 with respect to shaft 38.

An axially aligned drive collar 40n is secured to pulley 40 as by screws 40p and has an internally splined hub 40q meshed with shaft splines 39. Shaft 38, during operation when the carrier 23 is displaced along the frame, slides axially through collar 40n while retaining drive between shaft 38 and pulley 40 without axial displacement of the pulley.

Shaft 38 enters the hydrostatic bearing unit cartridge 37 wherein as will appear it may be operably drive connected to the inserted workpiece 13. By confining pulley 40 against axial displacement and by providing the splined drive connection between pulley 40 and shaft 38, continuous rotation of shaft 38 need not be interrupted as the carrier for the cartridge is axially displaced along guide rails 29 and 31.

As shown in FIG. 6 a tubular enclosure 20 extends from the frame to enclose the splined end of shaft 38 during displacement, and a suitable sheet metal cover 20a secured to the frame as by screws 20b extends over the upper part of the pulley.

The foregoing drive structure is essentially duplicated for driving pulley 61 at the other end of the support structure.

Similarly, housing carrier 22 is slidably mounted on the machine frame guide rails 52 and 53 which are in parallel alignment with rails 29 and 31, and displacement of carrier 22 is controlled by parallel cylinders 54 and 55 connected by piston rods 56 and 57, respectively, to housing 51. A shaft 58 having a splined section 59 axially slidably extending through a pulley 61 extends into the bearing unit cartridge 62 to be connected, as will appear, to rotate workpiece 11.

Pulley 61 is confined against axial displacement, is nonrotatably mounted on shaft 58 through the splined drive connection provided by section 59, and is connected by belt 63 to an idler pulley 64 (see FIG. 4). The construction of pulley 61 and its mounting are essentially the same as shown for pulley 40 in FIG. 10, whereby pulley 61 is restrained against axial movement and is drive connected to shaft 58 by splines 59 which slide through the pulley while maintaining drive association therewith while carrier 22 is being displaced along the support structure. Pulley 64 is mounted on an idler shaft 64a which is suitably journalled for rotation about an axis extending parallel to and vertically below shaft 58. A further pulley 64b, which is mounted on shaft 64a, is connected by a belt 64c to a pulley 64d (FIG. 1). Pulley 64d is mounted on an output shaft 65 of an independent power unit 66 that comprises an electric motor 67 connected to shaft 65 through a clutch 68 and having a braking unit associated therewith at 69.

The hydrostatic bearing unit cartridges 37 and 62 are preferably exactly alike, and similar reference numerals will be used for both. FIG. 3 shows internal details wherein the cartridge unit comprises a housing 71 that has a cylindrical periphery fitted snugly within the inner periphery 72 of frame 51. A series of machine screws 73 extend through a radial housing flange 74 to fix housing 71 to frame 51. A forwardly extending hollow conical nose portion 75 of the housing is secured to the housing by a row of screws 76 at flange 74.

Housing 71 is formed with a forwardly open relatively large diameter recess 77, and recess 77 is provided front and rear with axially spaced concentric cylindrical surfaces 78 and 79, surface 78 near the bottom of the recess being of slightly smaller diameter. Concentric with recess 77 is a smaller diameter bore 81 through rear wall 82 of the housing.

Within recess 77 a housing core section 83 is secured as by a series of machine screws 84 extending through wall 82. Core 83 is formed with cylindrical end surfaces 85 and 86 fitting snugly with recess surfaces 78 and 79, respectively, and resilient seal ring and groove arrangements indicated at 87 and 88 respectively provide static seals, whereby interiorly of the housing 71 an annular chamber 89 is defined between core 83 and the surrounding housing portion.

As will appear core 83 is formed with special lubricant distribution passages. It is preferably made as a physically separate part from the housing to permit the forming therein of such passages without unduly complex casting or machining operations, but once in place as shown in FIG. 3 it becomes essentially a unitary part of housing 71.

Power driven shaft 58 is connected to a coupling 91 which is secured to the end of a drive sleeve 92 by bolts 93. Sleeve 92 is nonrotatably mounted, as by splines at 94, on the end of a hollow arbor assembly 95. Arbor assembly 95 comprises a rear section 96 having a cylindrical surface 97 passing through a surrounding cylindrical bore 98 in core 83, a radially enlarged flange section 99 adjacent the flat front core face 100 which is perpendicular to the arbor axis, and a forward section 101 having an internal cylindrical bore 102 and an outer cylindrical periphery 103 surrounded by a cylindrical bore 104 on the front end of the housing nose 75.

As will appear the arbor assembly is radially supported within the housing on hydrostatic bearing means effective between arbor section 96 and bore 98 and between arbor section 101 and bore 104.

Arbor section 96 is enlarged internally at 105 to form a cylinder chamber 106 within which a piston 107 is slidably mounted. A compression spring 112 reacts between a radial wall 113 within the arbor and piston 107 to urge the piston to the right in FIG. 3.

A piston rod 114 fixed to piston 107 extends slidably through a cap 115 secured as by screws 116 to the flange section of the arbor to otherwise close the forward end of chamber 106. A suitable sealed bearing assembly indicated at 117 permits free sliding of rod 114 while maintaining fluid pressure in chamber 106. A spacer sleeve 110 on rod 114 limits forward displacement of piston 107.

At its forward end piston rod 114 is secured to a swivel coupling 118 perpipherally engaged in internal annular grooves 119 on the rear end of a series of chuck elements 121 which in turn are axially slidably mounted on a chuck element 122 fixed as by screws 123 upon the arbor assembly. There are usually several chuck elements 121 equally circumferentially distributed about the workpiece.

The forward end of each chuck element 121 has an inner workpiece engaging surface 124 and an external generally conical contour forward inclined surface 125 that slidably engages a similarly inclined surface 126 on fixed clutch element 122. Fixed clutch element 122 has an internal annular workpiece engaging surface at 127, and a series of circumferentially spaced internal workpiece engaging surfaces 128 between which extend the movable chuck elements 121.

The chuck arrangement and structure shown in FIG. 3 is for holding axle spindles of the shape illustrated. The invention contemplates any equivalent chuck arrangement suited to the workpieces being welded.

In FIG. 3, piston 107 is shown displaced to its rearmost position by fluid pressure in chamber 106, and in that position it has displaced chuck elements 121 to the left whereby they ride up cam surface 126 to contract the chuck and peripherally grip workpiece 11 to lock it non-rotatably to the arbor assembly 95 concentrically on the axis of rotation of the arbor assembly. This condition exists during the friction welding operation as will appear.

The rear end of housing bore 81 contains a ring 131 the internal periphery 132 of which has free running clearance with the arbor. Collar 131 is secured to the housing as by screws 133 and mounts an annular axially resilient seal assembly 134 axially disposed between the stationary housing and the rotating arbor assembly. Thus no lubricant can escape axially through housing bore 81.

At the front end of the cartridge, housing member 75 terminates in boss 135 having a cylindrical bore 136 snugly receiving the cylindrical surface 137 of a bearing collar 138 secured to the housing as by screws 139. Bore 104 is formed on the inner periphery of collar 138. Static seal rings 139 and 141 are provided between surfaces 136 and 137.

At its forward end a ring 142 secured to collar 138 as by screws 143 mounts an axially resilient seal assembly 144 axially disposed between the stationary housing structure and the rotating arbor assembly. Thus no lubricant can escape through the front end of the housing.

Seals 134 and 144 are the only two seals needed between the arbor assembly and the housing in the novel structure of the invention.

An annular groove 151 is provided in surface 136 axially between the seal rings 139 and 141, and a radial inlet passage 152 extends outwardly from this groove to connect with a supply conduit 153. Referring to FIG. 3, it will be seen that the internal surface 104 of bearing collar 138 is formed with an equally circumferentially spaced series of (usually about six) cavities 154 of the same size, and each cavity is connected to groove 151 by a radial passage 155 defining a flow restricting orifice of predetermined size contained in a threaded fitting 156.

The diameter of cylindrical surface 104 is accurately machined a small amount larger than the diameter of cylindrical arbor surface 103.

Oil under high pressure enters passage 152 and distributes circumferentially around groove 151 from whence it is directed through the restricted orifices into cavities 154. Cavities 154 therefore are filled with the oil under pressure, and the differences in diameters of surfaces 103 and 104 provides gaps indicated at 158 (FIG. 3) and between the adjacent cavities 154 (not shown). Normally no oil flows through the gaps between the cavities because the pressure of oil in adjacent cavities is substantially equal during normal operation. As shown in FIG. 3, gaps 158 extend axially, and cavity oil leaking laterally through these gaps 158 flows directly, and through drain holes 160 to enter a low pressure space 161 within the housing. From space 161, oil flows through passage 162 back to the sump.

Thus, with the arbor assembly rotating about its axis indicated at 159, its forward end is radially supported by the high pressure oil circulating in the cavities 154 and gaps 158 and there is no metal to metal contact at surfaces 103 and 104. The foregoing constitutes the front hydrostatic journal bearing in the assembly.

Referring to FIG. 3, an oil supply conduit 161' enters a housing passage 162' opening into chamber 89. The housing core 83 is formed around its internal periphery with a series of spaced cavities 163 each of which is connected to chamber 89 by calibrated accurately sized, restricted sharp-edged orifices in the passages indicated at 165. Cavities 163 are the same size and equally spaced around the surface 98.

Cylindrical surface 97 is of slightly smaller diameter than internal cylindrical surface 98 of the housing core. The incoming oil maintains high pressure in cavities 163 to provide balanced support of the arbor during rotation. The gaps 166 that exist between concentric surfaces 97 and 98 provide relief passages between the cavities and at the sides as indicated in FIG. 3 to discharge oil into a core passage 167 through which oil flows back to the sump. Communication between passage 167 and chamber 89 is blocked by plug 168.

The foregoing provides a second hydrostatic journal bearing for the arbor assembly.

As shown in FIG. 3, chamber 89 is connected by a core passage 171 to an annular recess 172 in surface 98, and oil from recess 172 flows through a plurality of openings 173 in the arbor to enter piston cylinder 106. Oil under pressure in cylinder 106 forces piston 107 to the left to its workpiece clamping position. Thus oil in the bearing assembly circuit must be pressurized before the workpiece 11 can be secured non-rotatably to the arbor.

An oil supply conduit 181 is connected by a core passage 182 to one end of a conduit 183 extending longitudinally of core 83 to open into a relatively shallow annular chamber 184 defined by annular recess 185 in the rear face of arbor flange 99 and the flat front face 100 of the core. Radially outwardly of chamber 184 the arbor flange is formed with an annular flat face 186 that is closely adjacent and parallel to core face 100 so as to define a restricted passage gap indicated at 187 through which oil from chamber 184 flows to lower pressure passage 162.

Gap 187 functions to provide a thin band of oil between surfaces 100 and 186, thereby providing a rear hydrostatic thrust bearing preventing metal to metal contact between arbor surface 186 and housing surface 100 even under the very heavy axial pressures encountered during friction welding.

Oil under the pressure of cylinder 106 also enters a plurality of radial passages 191, and one or more of these passages 191 is connected by a sharp-edged, calibrated orifice 192 providing a restricted entrance that opens into an annular groove 194. Groove 194 is formed in a fixed ring block 195 secured to the housing by screws 196. Orifice 192, as shown in FIG. 3A, is defined by a thin orifice disc 193 which is held in place by an annular fitting 193a. Disc 193 is disposed in a short axial passage 193b extending from passage 191 to face 197. This type of structure is preferably used to provide the sharp-edged orifices at 155 and 165. Oil under pressure is thus delivered through orifice 192 to the annular interface between the front surface of flange 99 and the housing and this provides a front hydrostatic thrust bearing preventing metal to metal contact between flat annular face 197 on the arbor and flat face 198 on the housing.

Oil under pressure (about 1500 p.s.i.) is delivered to both hydrostatic journal bearings of the unit. With reference to FIG. 3, the oil at line pressure from conduit 153 and passage 152 enters groove 151 which circulates it to simultaneously pass through the restricted orifices 157 into cavities 154, so that all of the cavities 154 solidly contain bodies of oil under pressure. Oil from the cavities also flows continuously back to drain through gaps 158 into passage 162.

The arbor assembly at the front end is therefore peripherally supported essentially by the pressurized oil bodies in cavities 154 out of metal to metal contact with internal surface 104 of the housing. The equal pressure areas at the cavities cooperate to automatically center the arbor assembly on its axis of rotation, and the arrangement prevents increasing radial loads on the arbor assembly from causing metal to metal contact between the arbor assembly and housing. For example, should the radial load on the arbor assembly increase at the top, this will result in the arbor assembly being displaced downwardly which will reduce the separation of surfaces 103 and 104 at the lower gaps 158 and increase the separation of those surfaces at the upper gaps. As a consequence the relief through gaps 158 between the lower cavities will be restricted to result in the oil pressure in the adjacent cavities increases, and the widened upper gaps 158 permit increased relief and therefore lowered oil pressure in the upper cavities. This condition prevails as long as there is an unbalanced load on the bearing. The increase in oil pressure, as at the bottom cavities in the foregoing example when algebraically added to the decrease in oil pressure at the upper cavities will equal the applied load. The foregoing action is rendered possible due to the provision of the restricted orifices through which oil enters the cavities as these orifices isolate the cavities from the pressurized source sufficiently to enable compensation to take place. When the arbor assembly becomes centered on the axis of rotation, all cavities are equally pressurized.

Oil from the line at 161' enters passage 162' to provide an annular body of oil in chamber 89 at pump pressure, and this chamber simultaneously supplies oil through all of the restricted orifices 165 into the cavities 163, whereby these cavities contain oil under pressure and are interconnected by circumferential gaps. Surfaces 97 and 98 are automatically maintained against metal to metal contact as described for the front bearing. Oil from cavities 163 continuously flows through the sides of gaps 166 to the drain passage 162.

Thus it will be seen that the entire arbor assembly is supported and automatically centered by the front and rear hydrostatic radial bearings in each cartridge. The combination of hydrostatic radial bearings with the components of a machine subject to such exceptionally large loads as friction welding apparatus is particularly novel and useful, because bearings of the usual tapered roll or ball type designed to withstand equivalent forces would be exceptionally large and unwieldy, difficult to mount and of such large weight and inertia as to require excessive forces to move and stop the large masses involved. The provision of hydrostatic bearings in the combination reduces the sizes of the workpiece carriers to unexpectedly small dimensions and provides better practical operational conditions within smaller space at less expense, and this contributes mainly to solve the problems of adapting friction welding to the joining of heavy large components.

Referring to FIG. 3, it will be seen that the hydrostatic radial bearings are disposed forwardly and rearwardly of the hydrostatic thrust bearings provided between the arbor assembly flanged section 99 and the housing. The novel cartridge unit of the invention contains only two oil seals between the entire rotating arbor assembly and the housing, which is extremely advantageous in view of the high speeds involved, and those seals are the end seals at 134 and 144 which are located so as to be subject only to oil at reduced pressure flowing away from the radial bearings. This aspect of the invention thus provides fewer seals and facilitates convenient repair of replacement by locating the seals at opposite ends of each carrier unit.

Since passage 171 conducts oil under pressure from chamber 89 to the cylinder 106, chuck elements 121 are displaced rearwardly in FIG. 3 to automatically clamp the workpiece 11 fixedly to the arbor assembly only when the radial bearings have been pressurized, and this takes place before the arbor assembly is rotated during the welding machine cycle. When the oil pressure drops in chamber 89 during the welding machine cycle, the pressure in cylinder 106 drops to allow spring 112 to push the chuck elements forward to release the workpiece. By making core 83 as a separate housing part for insert in the assembly, machining and other forming of the oil passages and surfaces therein is simplified and may be carried out apart from the housing 71.

A pump (not shown) delivers oil through conduit 181 into the rear hydrostatic thrust bearing at chamber 184 under a variable pressure depending upon the magnitude of the imposed thrust load.

Referring to FIG. 3, it will be seen that chamber 184 contains an annular band or pad of oil, and oil from chamber 184 passes continuously radially out in an annular thin layer in the gap 186 between surfaces 185 and 100 to discharge into drain passage 162 which delivers the oil back to sump 201.

The arbor assembly 95 is so mounted in the apparatus as to have a predetermined range of controlled small axial float in the housing. The allowable degree of float is such that, with zero thrust (no axial load) which is the condition that exists before the workpieces 11 and 13 engage the ends of workpiece 12, oil pressure in chamber 184 urging the arbor assembly forwardly increases gap 187 to such width that the pump pressure falls to only about five percent of its maximum value. This automatic relief means that little power is consumed and the apparatus is free of high pressure oil strain except when actually performing the welding operation during each cycle.

It is a noteworthy feature of the invention that the high pressure oil circuit within each cartridge requires no oil seals within the cartridge. The only oil seals at 134 and 144 need withstand only lower oil pressures.

The annular land 172a (FIG. 3) in surface 98 effectively isolates the rear or outboard hydrostatic journal bearing from the higher pressure oil in the thrust bearing circuit, the space between surfaces 97 and 98 extending between chamber 184 and and groove 172 providing a very low leakage seal between the two oil circuits within the cartridge.

A hydrostatic reverse thrust bearing is provided at the front side of flange section 99 of the arbor assembly, where oil at the pressure of piston chamber 106 is discharged through the series of circumferentially spaced restricted orifices 193 to expand at lower pressure into annular groove 194, and this lower pressure is adequate to always maintain flange section 99 of the arbor assembly from metal to metal contact with the housing.

When the pressurized oil circuits in the radial journal bearings have been established, when the power units 45 and 65 are actuated to drive the arbor assemblies, and when the arbor assemblies are up to speed, the respective cylinders at 32 and 33 and 54 and 55 are operated to slide carriers 22 and 23 toward each other to frictionally engage the workpieces. Once these are engaged the journal and thrust loads, particularly the latter, increase tremendously. The automatic compensation at the journal bearings has been above described.

As the thrust increases the entire arbor assembly will tend to shift rearwardly relative to housing 71, to the left in FIG. 3. This does not cause any oil leakage at the end seals 134 and 144 because these seals are axially resilient and the oil pressure there is relatively low, and seal 144 axially expands to maintain sealing engagement with the housing. Rearward displacement of the arbor assembly results in restriction of the annular gap 187 between the flat parallel surfaces 100 and 186, to decrease the relief from chamber 184, and this results in oil pressure building up between the constant displacement pump delivering oil to line 181 and chamber 184. The pump is of such capacity as to be capable of developing counter pressures opposing the thrust up to 2,000 p.s.i. in chamber 184, which in a friction welding apparatus for welding spindles onto axle housings is adequate to oppose axial thrust up to 150,000 pounds at the welding joint.

The foregoing hydrostatic bearing arrangements are particularly effective in heavy duty friction welding apparatus wherein the welding cycle involves periods where full capacity of the thrust is developed at zero speed. The weld under the applied axial pressure develops immediately after rotation of the end workpieces 11 and 13 is stopped. Hydrostatic bearings as disclosed maintain adequate film thickness layers of lubricant at the gaps 158, 166 and 187 under the very heavy load low speed conditions encountered. As a result of the pressurized oil support conditions provided by the hydrostatic bearings there is little or no bearing starting friction to overcome when the motors 46 and 67 are set in operation and minimum power is required for accelerating the rotating workpieces, and operational speeds are quickly attained even for such heavy masses as axle housing components, which speeds operation and increases production.

It is also to be noted that the pressure of oil supplied to the thrust bearings varies with the imposed axial load from a small value approaching zero to a much greater value, with the upper limit being appreciably higher than the fixed supply of pressure to the journal bearings.

The foregoing structure and mode of operation of the hydrostatic bearing units together with the hydraulic circuits for operating the same are disclosed and claimed in the copending application of Alex F. Stamm, Ser. No. 650,505, filed June 30, 1967, for Friction Welding Apparatus, and reference is made thereto for any detail necessary to understanding the presently claimed invention.

Also, the overall combined electrical and hydraulic control system for carrying out the weld cycle in an automatic machine is disclosed and claimed in the copending application of Alex F. Stamm, Ser. No. 650,396, filed June 30, 1967, for Method and Apparatus for Friction Welding, and reference is made thereto for any detail necessary to understand the presently claimed invention.

Referring to FIGS. 1 and 4, the machine support structure 21 comprises three sections 201, 202 and 203 rigidly connected end to end. The end sections 201 and 203 mount the hydrostatic bearing unit carriers 22 and 23 and associated mechanism for driving the arbors in those units and shifting the units along the frame guideways. These two end sections are substantially identical in construction although reversely disposed in the assembly. The center section 202 contains clamps for rigidly securing the stationary workpiece 12 against any movement during an operational cycle. It will be noted (FIG. 1) that the power sources 45 and 66 are independent units rigidly mounted on the floor separately from the support structure 21. This reduces possible vibration in the support structure during friction welding.

Referring now to the center section of the support structure and FIGS. 1, 4, 5 and 7–9, the cradle 14 for mounting the stationary workpiece comprises an adjustable jaw central portion wherein jaws 15 and 16 face each other transversely, and the two adjustable jaw end portions 17 in each of which jaws 18 and 19 face each other transversely.

Jaws 15 and 16 are fixed on blocks 215 and 216 slidably mounted in transverse alignment on guideways 217 in laterally opposite columns 218 and 219 which form part of a U-shaped casting 221. Columns 218 and 219 extend upwardly from the crosspiece of casting 221 which is rigidly secured to the support structure as by bolts 222.

Midway between jaws 15 and 16, plate 221 is formed with a rectangular keyway 223 extending longitudinally on the machine centerline and in which are adjustably mounted a pair of clamp jaws 224 and 225 that may be locked by bolts 226 and 227 respectively. These are internal jaws fitting into the carrier mounting opening of a drive axle housing in the preferred embodiment of the invention.

Figure 8:
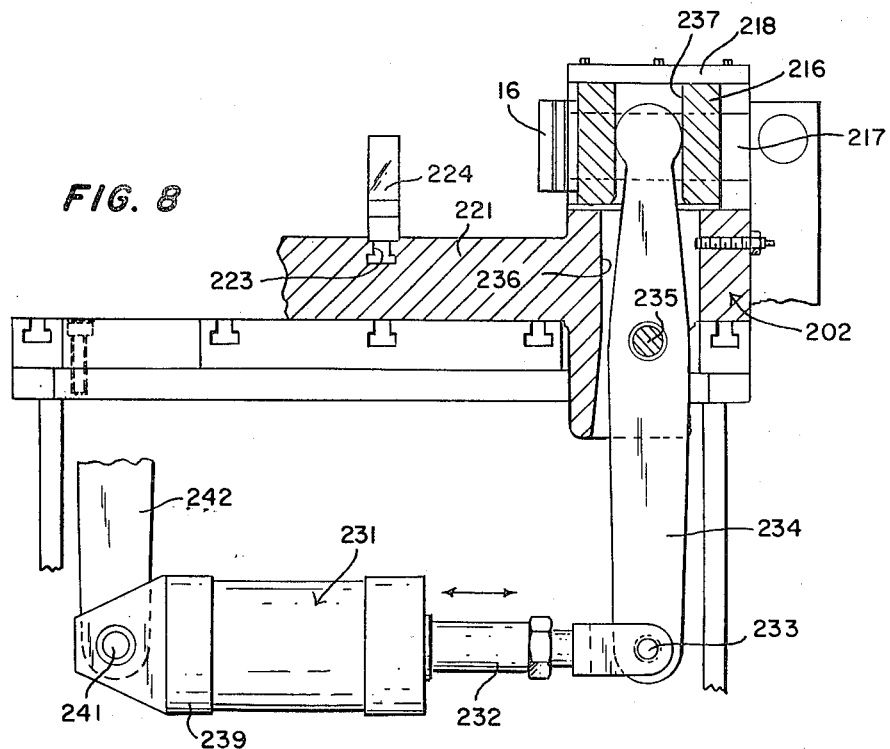
FIG. 8 is a fragmentary view partly broken away and in section showing the mechanism for moving the central stationary workpiece clamp jaws.
Figure 9:
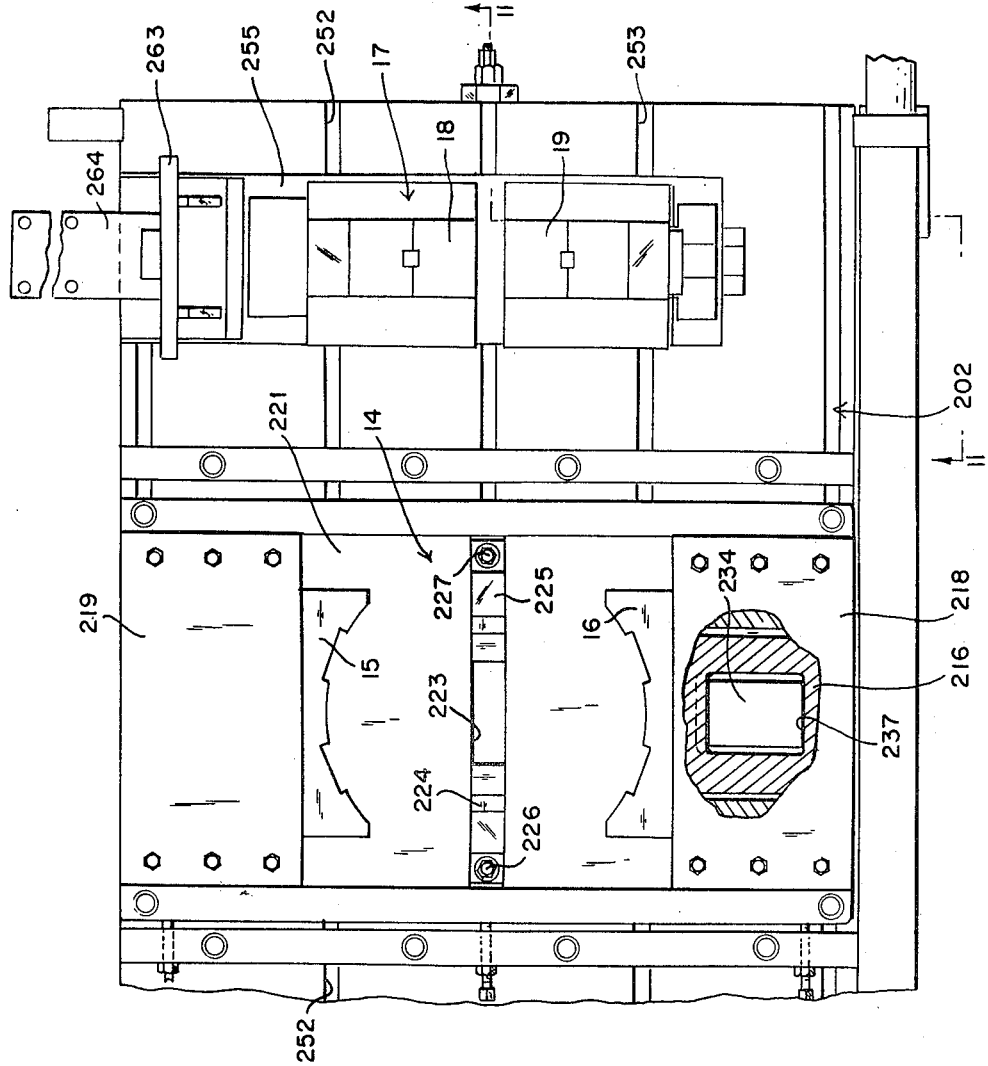
FIG. 9 is a fragmentary top plan view showing further detail as to clamping of the stationary workpiece.

Referring to FIG. 8, an expansible fluid pressure cylinder 231 suitably mounted within the interior of base section 202 has its slidable piston rod 232 connected pivotally at 233 to a generally vertically extending lever 234 rockable about a fixed pivot 235 on the base. The upper end of lever 234 extends freely through an opening 236 in the machine base into the recessed interior 237 of jaw block 216 to which it is slidably connected. Similarly, casing 239 of the cylinder is pivoted at 241 to the lower end of a lever 242 similar to lever 234 and similarly pivoted on the frame by pin 243 (FIG. 5) and slidably connected to the jaw block 215. The axes of pivots 235 and 243 are parallel and they lie in the same horizontal plane. Levers 234 and 242 are of the same length and effective leverage.

In operation, the parts are generally as shown in FIG. 8 in initial position with the levers 234 and 242 vertical and jaws 15 and 16 retracted, and horizontal cylinder 231 is in its contracted condition. When fluid under pressure is supplied to cylinder 231, as by the control means disclosed in said copending Ser. No. 650,396, during the proper part of the welding cycle, rod 232 slidably displacing equally in opposite directions. This oppositely rocks both lever 234 and 242 to displace jaws 15 and 16 toward each other to grip the stationary workpiece 12. Due to the length of these levers a considerable clamping force is provided, and due to the interconnection of the levers by the fluid pressure cylinder compensate relative displacement of the jaws is permitted to insure an even centered grip on the stationary workpiece.

Referring now to FIGS. 1, 4, 9, 11 and 12, in each of the end clamps 17 the opposing jaws 18 and 19 are mounted on similar columns 251 and 252 respectively (FIG. 12) that have their lower ends formed with a dovetail recess 253 (FIG. 11) slidable toward and away from each other on a correspondingly shaped transverse guide rail 254 which in turn is secured to a plate 255 that is supported on the base center section. As shown in FIG. 11, plate 255 has a threaded bore 256 located longitudinally centrally of the machine receiving a screw 257 that has its head 258 rotatably mounted but axially fixed on the frame at 259. When screw 257 is turned, plate 255 is displaced longitudinally of the machine. Key 261 which projects into a keyway 262 is fixed to plate 255 and maintains longitudinal alignment of the jaws with respect to the workpiece as the jaws are adjusted by manipulation of screw 257.

Referring to FIG. 12, plate 255 has secured thereto an upright member 263 having a shaft 264 mounting a hydraulic motor 265 the output shaft 266 of which carries a sprocket connected by chain 268 to a sprocket 269 on a horizontal shaft 271.

The opposite ends of shaft 271 are journalled in suitable bearings at 272 and 273 on plate 255 and these bearings also prevent axial displacement of the shaft. Shaft 271 extends through aligned bores 274 and 275 in columns 251 and 252 respectively. Shaft 271 is formed with oppositely threaded sections 276 and 277 disposed in correspondingly threaded bores 278 and 279 in the respective columns, whereby rotation of shaft 271 in one direction will advance jaws 18 and 19 into gripping relation with the stationary workpiece and rotation in the other direction will separate jaws 18 and 19.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Friction welding apparatus comprising a support structure, means on said structure for releasably securing a stationary workpiece rigidly thereto, a nonrotatable carrier, workpiece holding means, hydrostatic bearing means rotatably mounting said workpiece holding means on said carrier in an axially fixed position relative thereto, slide guide means mounting said carrier for axial displacement along said structure toward and away from said stationary workpiece holding means, force producing means interconnecting said structure and said carrier for axially displacing said carrier along said structure, and means including stationary motor means on said structure connected operably to said workpiece holding means on the carrier for continuously rotating the workpiece holding means on said carrier effective in all axially displaced positions of the carrier along said structure.

2. In the friction welding apparatus defined in claim 1, said workpiece holding means supported by said hydrostatic bearing means on the carrier comprising a rotatable arbor assembly having a clutch at one end for releasably holding a workpiece, said means for continuously rotating the workpiece holding means including means at the other end of said arbor assembly axially slidably but nonrotatably connecting it with a rotatable axially fixed drive member, and means operably connecting said drive member to a stationary drive motor unit.

3. In the friction welding apparatus defined in claim 2, said arbor assembly at said other end being provided with a splined shaft portion and said drive member being a pulley having a splined axially slidable connection with said shaft section.

4. In the friction welding apparatus defined in claim 3, means on said structure for positively restraining said pulley against axial displacement relative to said splined shaft portion.

5. In the friction welding apparatus defined in claim 1, said structure comprising separate machine base sections rigidly connected together end to end in assembly and respectively mounting said stationary workpiece securing means and said carrier.

6. In the friction welding apparatus defined in claim 1, said means for rotating the workpiece holding means on said carrier comprising a power unit having a motor rigidly supported independently of said support structure, a belt and pulley drive system on said support structure connected to said workpiece holding means on the carrier, and belt and pulley drive means between said motor and said system.

7. In the friction welding apparatus defined in claim 1, there being two of said carriers slidably mounted on said support structure, one at each end of the means for securing the stationary workpiece, and means providing independent power units for rotating the workpiece holding means on the respective carriers, said power units being rigidly supported independently of said support structure.

8. In the friction welding apparatus defined in claim 1, said means for securing the stationary workpiece to the structure comprising a plurality of pairs of opposed transversely adjustable workpiece clamping jaws.

9. In the friction welding apparatus defined in claim 8, one pair of said jaws comprising opposed jaw members slidably mounted in transverse alignment on said support structure, and means for simultaneously shifting said members toward or away from each other.

10. In the friction welding apparatus defined in claim 9, said means for shifting said members comprising pivoted levers on said structure each operably connected at one end to one of said jaw members, and a longitudinally expansible and contractible fluid pressure cylinder operably connected between the other ends of said levers.

11. In the friction welding apparatus defined in claim 10, said levers being of equal length and substantially vertically disposed and pivoted on axes that are parallel to the direction of displacement of said carrier.

12. In the friction welding apparatus defined in claim 11, said levers having slidable connections with said jaw members and pivotal connections with said fluid pressure cylinder, all of said pivotal connections having parallel axes.

13. In the friction welding apparatus defined in claim 8, means on said structure disposed intermediate said jaw members mounting spaced workpiece engaging elements for relative adjustment in the direction of movement of said carrier.

14. In the friction welding apparatus defined in claim 9, another pair of said jaws comprising opposed jaw members having transverse slide guide connection with said support structure, a shaft extending through both of said elements, differential threaded connections between the shaft and the respective elements, and means for selectively rotating said shaft.

15. In the friction welding apparatus defined in claim 9, a member having a transverse slide guide on which another pair of opposed jaw members are mounted for movement toward and away from each other, means on said member for selectively moving said jaw members toward and away from each other, and cooperating means on said member and structure for adjusting said member substantially in the direction of movement of said carrier.

16. In the friction welding machine defined in claim 2, said hydrostatic bearing means comprising hydrostatic thrust bearing means intermediate said carrier and said workpiece holding means for transmitting axial force therebetween and hydrostatic journal bearing means intermediate said carrier and said workpiece holding means for rotatably supporting said workpiece holding means.

References Cited

UNITED STATES PATENTS

| 3,349,982 | 10/1967 | Lipp et al. | 228—2 |
| 3,337,108 | 8/1967 | Taylor | 228—2 |
| 2,663,206 | 12/1953 | Whieting | 228—2 |
| 3,388,849 | 6/1968 | Blum | 228—2 |
| 3,238,612 | 3/1966 | Herman | 228—2 |
| 3,412,916 | 10/1968 | Dunlap et al. | 228—2 |

FOREIGN PATENTS 1,097,233    1/1968    Great Britain.

JOHN F. CAMPBELL, Primary Examiner

R. J. CRAIG, Assistant Examiner

U.S. Cl. X.R.

29—470.3; 169—73; 308—169

PO-1050
(5/69)

UNITED STATES PATENT OFFICE
CERTIFICATE OF CORRECTION

Patent No. 3,516,591          Dated June 23, 1970

Inventor(s) ARTHUR F. GAGE

It is certified that error appears in the above-identified patent and that said Letters Patent are hereby corrected as shown below:

Column 1, line 20, after "work-" add -- piece are clamped while being moved into frictional --.

Column 1, line 27, change "The" to -- This --.

SIGNED AND
SEALED
NOV. 17 1970

NOV. 17, 1970

(SEAL)
Attest:

Edward M. Fletcher, Jr.
Attesting Officer

WILLIAM E. SCHUYLER, JR.
Commissioner of Patents